(12) United States Patent
den Bieman et al.

(10) Patent No.: US 6,355,173 B1
(45) Date of Patent: Mar. 12, 2002

(54) CLEANING METHOD FOR MEMBRANES

(75) Inventors: Henricus A. C. I. den Bieman;
Jacobus Cornelis Segers, both of
Vlaardingen (NL); Vangelis Stavridis,
Faliro (GR)

(73) Assignee: Unilever Patent Holdings BV,
Vlaardingen (NL)

( * ) Notice: Subject to any disclaimer, the term of this patent is extended or adjusted under 35 U.S.C. 154(b) by 0 days.

(21) Appl. No.: 09/485,539

(22) PCT Filed: Jul. 23, 1998

(86) PCT No.: PCT/EP98/04977

§ 371 Date: Apr. 28, 2000

§ 102(e) Date: Apr. 28, 2000

(87) PCT Pub. No.: WO99/07459

PCT Pub. Date: Feb. 18, 1999

(30) Foreign Application Priority Data

Aug. 12, 1997 (EP) .............................. 97202498

(51) Int. Cl.$^7$ .............................................. B01D 65/02
(52) U.S. Cl. ...................... 210/636; 210/650; 210/798; 554/211
(58) Field of Search .......................... 210/321, 69, 636, 210/637, 650, 651, 798, 739, 500.42; 554/174, 175, 211; 426/417, 601

(56) References Cited

U.S. PATENT DOCUMENTS 3,992,301 A * 11/1976 Shippey et al. ............. 210/636
4,545,940 A * 10/1985 Mutoh et al. ............... 554/211
5,482,633 A    1/1996 Muraldihara et al.

FOREIGN PATENT DOCUMENTS

DE        33 12 573 A     10/1983

OTHER PUBLICATIONS

Patent Abstract of Japan, vol. 9, No. 134 (C–285). Jun. 8, 1985 & JP 60/022906 A (Asahi Kasei Kogyo KK), Feb. 5, 1985 (translation).
Patent Abstracts of Japan, vol. 97, No. 6, Jun. 30, 1997 & JP 09 047641 A (Asahi Chem Ind Co Ltd), Feb. 18, 1997 (abstract).

* cited by examiner

Primary Examiner—Joseph W. Drodge
(74) Attorney, Agent, or Firm—Morgan, Lewis & Bockius LLP

(57) ABSTRACT

Oils, extracted from vegetables and animal tissues contain impurities such as waxes that can be removed in a refining process, including dewaxing of the oils that include removal of oils by filtration through membranes. During filtration, the impurities stick to the membranes, which causes a reduction in flux through the membranes. The initial top flux can be approached again by regularly cleaning the membranes including steps of: backblowing with gas, backflushing with edible oil, and treating the membranes with alkaline material. The cleaning method is particularly suitable for cleaning membranes in the form of microfilters having an average pore diameter of 0.5–5 $\mu$m, which are used in the refining process.

13 Claims, 1 Drawing Sheet

CLEANING METHOD FOR MEMBRANES

This application is a 371 national phase application of international application PCT/EP98/04977 filed Jul. 23. 1998 which designated the U.S.

FIELD OF THE INVENTION

The present invention relates to a method for cleaning porous membranes, in particular microfilters that are used in an oil dewaxing process.

BACKGROUND OF THE INVENTION

Oils, extracted from vegetable and animal tissues, contain a number of impurities, which have to be removed in order to make the oil suitable for human consumption. In the oil refining process several impurities can be removed by a filtration step.

The impurities in the context of the invention are substances and/or compounds that cause cloudiness in the oil upon cooling to a temperature range from ambient temperature to 0° C. The impurities include proteins, glucosides, waxes, terpenes, squalenes, seed-residues, oxidized materials, or traces of earth.

One type of impurities consists of waxes, which are high melting esters of fatty alcohols and fatty acids, having a low solubility in oils. The quantity of waxes in crude oils varies from several hundred parts per million (ppm) to several thousand ppm. The wax content has to be reduced to a level of about 10 ppm or less, so that the cold stability of oil is improved. A known method for dewaxing oil consists of carefully cooling the oil, during which wax crystals are formed. This process is known as winterization.

Subsequently, the above indicated impurities can be removed by filtration. Several filtration methods are known from the prior art. The methods can differ in membrane material and type of filtration unit.

Known methods for filtration are filtration over filter cloth, paper or metal gauze filters at an average pore size of 25–100 $\mu$m, filtration over fine filter cloth with an average pore size of 20–30 $\mu$m, and filtration over microfilters with an average pore size of 0.05–5 $\mu$m.

One known method which is particularly suitable for removing waxes and other impurities from oil, is filtration over microfiltration membranes. For instance, EP-A-397,233 discloses a dewaxing method in which after drying, the oil is cooled at a specific cooling rate, during which at a certain temperature wax crystals form. The solid wax is removed by microfiltration over a microfilter module having a filtration area of about 0,2 m$^2$ and having a nominal pore diameter of 0.2 $\mu$m. A second type of microfilter used in EP-A-397,233 is a sintered metal filter having a filtration area of about 0.18 m$^2$ and a nominal pore diameter of 0.5 $\mu$m.

A major drawback of all known filtering processes is that the wax and other impurities stick to the filters, thereby reducing the flow of oil through the filters. This flow through the filters is also called flux.

Flux will be used in this application as the amount of oil that can pass through a certain area of a membrane in a certain amount of time at a standard transmembrane pressure and at standard temperature. In practice, preferably a transmembrane pressure of 1–3 bar, more preferred 3 bar is used.

For the purpose of the invention, the side of the membrane at which the clean, filtered oil emerges is called the permeate side. The side at which the impurities accumulate on the membrane is the original liquid side.

The sticking of impurities to filters is also known as fouling. Several fouling mechanisms have been identified. Among these are: gel-layer fouling, adsorptive fouling and pore blocking.

Several methods are known to reduce fouling, especially pore blocking.

The most widely applied method to improve filtration over classical cloth or metal gauze filters is the addition of a filter aid to the oil that is to be filtered. This is described in Bailey's industrial oil and fat products, fifth edition, vol 2, page 645, published by John Wiley & Sons, Inc. Drawbacks of this method are the high cost of the filter aid, extra oil losses and formation of solid waste.

For cleaning microfilters which are clogged by fouling several methods have been described. For instance, U.S. Pat. No. 5,482,633 discloses the use of ceramic microfilters in the wax-filtration process. A vegetable oil/particulate wax blend is filtered through a porous nonmetallic inorganic filter having a pore diameter of 0.5–5 $\mu$m. Cross-flow filtration is applied. The described filtration process includes at least about one backflush with permeate for every period of cross-flow filtration of about 3 to 5 hours. The backflush takes a few seconds. After a designated period of use, the filter is regenerated with warm clean oil. It is mentioned that it is also possible to use a cleaning agent.

We have found that filters, cleaned by the process according to U.S. Pat. No. 5,482,633 will still show a high degree of fouling and relatively quick reduction of the flux rate in time. Another disadvantage is that these filters are expensive so regular replacement is not desirable.

DE-A-3312573 discloses a process for dewaxing of vegetable oil, under application of a porous membrane. Said membranes have a pore diameter of 0.05–$\mu$m. In the course of time, when the flux is reduced a backwash treatment or rinsing treatment with a medium at 30–100° C. is applied. The rinsing medium can for example be vegetable oil, n-hexane or acetone. In addition gases can be used, for example air, nitrogen, oxygen, carbon dioxide, argon or helium. We have found that the results of the cleaning process disclosed by this document leave to be desired.

JP 09/047641 discloses a method of washing a porous membrane. Oil is removed from a membrane used for removing wax from plant oil, and the membrane is subsequently subjected to a hydrophilizing operation and washed with water. According to the method disclosed in this document, after dewaxing and filtering the used membrane is subjected to reverse washing with gas and fluxing with oil. Then the membrane is rinsed with hexane followed by filtering to remove more oil. Subsequently a hydrophilizing treatment is carried out, whereupon a hot aqueous solution is passed through the membrane. Lastly the membrane is washed with water. Alternatively, methanol is passed through the membrane. According to the method disclosed in this document a treatment with hexane and methanol or ethanol is required. Applicants have found that the use of such organic solvents has several disadvantages. For example these compounds are hazardous to the health of the people working with them. Moreover the risk of fire or even explosions is considerable if such compounds are used. Furthermore the disposal of spent solvents having undesirable environmental effects may form a problem in industrial application of the methods disclosed in JP 09/047641.

JP 60/22906 discloses another process for cleaning filters wherein filter-clogging substances are removed from microfilters by applying a combination of flushing with an inert (compressed) gas and rinsing the filters with hot oil in which the waxes dissolve. In the wax-removing process, described in this specification, the wax accumulated on the surface of the membrane and probably also in the pores of the membrane, is subjected to a flushing (also called backwash) from the permeated liquid side of the membrane to the original liquid side of the membrane. As a result, the flux of the initial stage can be achieved again. The backflush is performed with compressed gas and/or dewaxed oil.

However, although gel-layer and adsorptive fouling may be reduced by the treatment disclosed in JP 60/22906, pore blocking can not be prevented and therefore micro-filters cleaned via this method have to be discarded and replaced regularly, for example about every 6 months. As these filters are very expensive, this filtration method is not widely used.

It has now surprisingly been found that it is possible to clean the microfilters in a special cleaning process by which the life time of the microfilters is extended, whereby the occurrence of pore blocking is effectively overcome. Furthermore, in this process the use of organic solvents is not required.

More in particular it has been surprisingly found that if the above mentioned filter recovery method comprising the steps of backflushing with inert (compressed) gas and backflushing with hot oil is combined with a regular treatment with alkaline material, preferably from the permeated liquid side to the original liquid side of the membrane, this leads to a very good recovery of flux through the membranes.

SUMMARY OF THE INVENTION

Accordingly the invention provides a method for cleaning porous membranes suitable for use in oil refining processes comprising the regular treatment of said membranes by applying the steps of:

(a) backblowing with gas
(b) backflushing with edible oil
(c) treating the membranes with alkaline material.

DETAILED DESCRIPTION OF THE INVENTION

As mentioned above, the process according to the invention provides a method for cleaning membranes, whereby no filter aid is needed. This is a major advantage in comparison to the prior art processes in which a filter aid is often used. The risk of fire, accompanying the disposal of used filter aid is herewith circumvented. We have also found that membranes, cleaned by the process according to the present invention, were functioning at satisfactory flux rate, at least five times as long as the membranes cleaned using the prior art procedure disclosed in JP 60/22906. As a result, the lifetime of said membranes is considerably extended.

For a more detailed description of the invention the following definitions are used:

Flux is as defined earlier namely the amount of oil that can pass through a certain area of a membrane in a certain amount of time at a standard transmembrane pressure and at standard temperature.

Top flux is the flux through the membrane when it is used for the first time and no fouling has taken place yet and no cleaning processes were applied before.

Maximum flux is the highest flux that can be reached through the membrane immediately after cleaning the membrane by one of the cleaning steps, according to the present invention.

Backblowing with Gas

Figure 1:
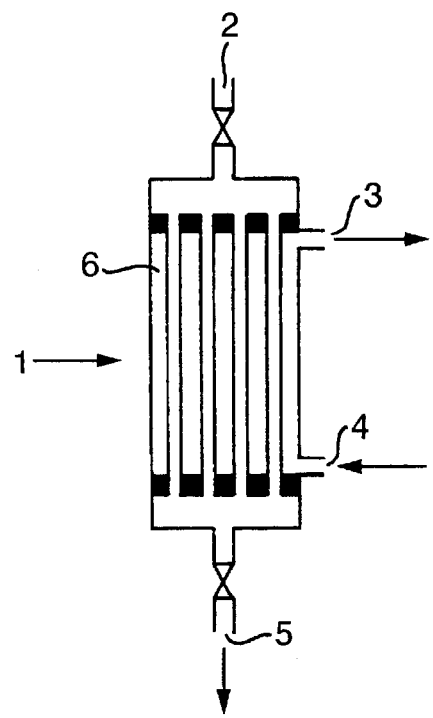
FIG. 1 shows a set of hollow fiber membrane modules used in the oil refining process.

The first element of the cleaning process of the present invention is backblowing with gas. This step is used to remove residual oil and waxes. The membrane is flushed from the permeate side to the original side with gas as illustrated in FIG. 1. This is preferably done when the flux has reduced to less than 95% of the maximum flux, more preferably reduced to 80–40% of the maximum flux, most preferred reduced to 65–50% of the maximum flux.

The backblowing can be carried out by actively applying a backpressure to the membrane with a compressed gas, or by applying a vacuum to the filter module system at the original liquid side. Due to the application of the vacuum, a gas will be sucked through the membranes from the permeated liquid side to the original liquid side, whereby the wax is blown away from the membranes. The same result is achieved if the membranes are backflushed with compressed gas. For the purpose of the invention, both treatments will be referred to as backblowing with gas.

In practice the backblow is preferably performed at a frequency of more than once every 8 hours, more preferably more than once every 4 hours, most preferred more than once every 40 minutes. The backblowing with gas is preferably carried out at a pressure of 1–3 bar, more preferably 1.5–3 bar, most preferred 2–3 bar. The backblowing with gas preferably lasts 5 seconds to 10 minutes, more preferably 20 seconds to 5 minutes, most preferred 30 seconds to 2 minutes.

The backblowing is preferably carried out with an inert gas, nitrogen gas being the most preferred inert gas, but for the purpose of the invention also another gas or air can be used if this does not react with the oil to be purified. However, it is also possible to use a gas that reacts with the oil to be purified, provided that the reaction products of the gas and the oil are removed in a later phase in the oil refining process.

Preferably the temperature of the flushing gas is between room temperature (RT.) and 100° C., more preferably between RT. and 80° C., most preferred between RT. and 60° C.

Back Flushing with Oil

As is illustrated in the examples, the above described backblowing with gas will still result in a gradually reducing maximum flow. Therefore after several batches the microfilters are backflushed with edible oil. This step of backflushing with oil is in fact a rinsing step with oil, whereby the rinsing is carried out from the permeated liquid side of the membrane to the original liquid side of the membrane. The waxes dissolve in the oil and the backflushing is preferably continued for a fixed time. In practice the backflushing with oil is carried out until the temperature of the incoming oil is equal to the temperature of the outcoming oil. We have found that all waxes and other impurities have dissolved by that time.

Said backflushing with oil is preferably carried out when the maximum flux rate through the microfilters measured directly after backblowing with gas has diminished to less than 90% of the top flux, preferably 80–50% of the top flux, most preferred 80–70% of the top flux. In practice, backflushing with oil is preferably performed at a frequency of more than once every 14 days, more preferably more than once every four days, most preferred more than once every day.

Preferably the rinse oil is at a temperature at which the wax and other impurities can dissolve in the oil, and the range from ambient temperature to 90° C. is most preferred. The upper limit of temperature can depend on the kind of filter material that is used. For example ceramic filters will be able to withstand higher temperatures than Polyvinylidene Fluoride (PVDF) membranes. PVDF membranes can withstand a temperature of at most 80° C.

The rinse oils used in the process according to the invention are edible oils, preferably the rinse oil is selected from the group of sunflower oil, maize oil, rape seed oil, cottonseed oil, olive oil, palm olein, palm kernel oil, coconut oil, soy-bean oil, rice bran oil, grape seed oil, safflower oil, groundnut oil, sesame oil, wheat germ oil, walnut oil, pistachio oil, and the like. The most preferred rinse oil is the same as the oil to be refined.

In a specific embodiment the rinse oil is hot non-winterized oil.

Alkaline Treatment

The third element of the cleaning method according to the invention is preferably applied when the maximum flux rate through the microfilters measured directly after the backflushing with oil, has diminished to less than 90% of the top flux preferably 90–30% of the top flux, most preferred 85–70% of the top flux. In this third cleaning treatment the filters are preferably treated with an alkaline material, desirably an alkaline solution with strength 1–15 wt %, more desirably 4–8 wt % and a pH of 10–14. This treatment is preferably a rinsing treatment. The alkaline treatment is preferably carried out at a frequency of more than once every 7 months, more preferred more than once every 6 weeks, most preferred more than once every 4 weeks.

The alkaline material can be prepared by any suitable method known and any suitable alkaline agent can be used. The alkaline material is preferably used as a solution. Preferably the alkaline agent is food grade. The alkaline cleaning solution for example comprises caustic soda, surfactants, detergents or a combination thereof.

The solvent for the alkaline solution can be an aqueous solvent or an organic solvent. The solution is preferably such that it can penetrate into the membrane pores. For the cleaning of a hydrophobic membrane a hydrophobic rinse solution is preferably used whereas a hydrophilic solvent is preferably used for a hydrophilic membrane.

Optionally before or after the alkaline treatment the membranes are rinsed with water. Preferably this water is at a temperature of 20–70° C. According to another embodiment said rinsing with water is carried out both before and after the membrane is rinsed with an alkaline solution.

Preferably the process according to the invention is free of the use of organic solvents such as ethanol, hexane or methanol. As mentioned above said organic solvents are considered to be unhealthy. Despite the omission of such organic solvents the current process provides an excellent cleaning method for membranes.

The cleaning process according to the invention is suitable for filter materials preferably selected from the group of organic filter materials, inorganic filter materials, ceramic filter materials, metallic filter materials. The more preferred filters to use in the cleaning process according to the invention are organic micro-filters.

The most preferred microfilters for the cleaning method according to the invention are manufactured and available form Asahi Chemical International Limited Japan and marked under the trade name Microza TP 313. This microfiltration module has a filtration area of 5 m$^2$. The module consists of a housing comprising a package of hollow fibers made of a synthetic polymer membrane, preferably Polyvinylidene Fluoride (PVDF), said membranes having a nominal pore diameter of 0.2 $\mu$m. The outline of a set up of several modules is shown in FIG. 1.

The membranes can be reversely pressurized. Reverse filtration or reverse blowing is permitted. The solvent that is used in combination with PVDF for treating with alkaline solution, is preferably a hydrophilic solvent.

Filters used for the cleaning process according to the invention preferably are microfilters having an average pore diameter (measured with the bubble test technique) of 0.05–5 $\mu$m, more preferably 0.1–3 $\mu$m, most preferred 0.2–0.9 $\mu$m.

In a specific embodiment the invention provides a method for cleaning PVDF microfilters suitable for use in oil refining processes comprising the regular treatment of said membranes by applying the steps of:

(a). backblowing with nitrogen gas (b). backflushing the membranes with hot oil (c). treating the membranes with an alkaline solution.

In this specific embodiment the process of the invention is preferably carried out as follows:

(a) the backblow with nitrogen gas is carried out at a frequency of more than once every 8 hours, preferably more than once every 4 hours, more preferred more than once every 40 minutes.

(b) the backflushing with oil is carried out at a frequency of more than once every 14 days, preferably more than once every 4 days, more preferred more than once every day.

(c) the alkaline treatment is carried out at a frequency of more than once every 7 months, preferably more than once every 6 weeks, more preferred more than once every 4 weeks.

In another embodiment the invention provides a method for cleaning microfilters whereby the process of the invention can be effectively used in a post winterization process for oil refining. For the purpose of the invention a post winterization process comprises the initial removal of bulk wax, that has been crystallized by cooling, by for example centrifugation, followed by removal of waxes that still remain by applying a controlled winterization treatment whereby said waxes are separated from the oil by filtration. The resulting oil is preferably substantially free of waxes.

The cleaning process according to the invention can be applied in any filtration step during the oil refining process, but it is particularly suitable for the filtering step in the dewaxing process. In this process waxes are removed from oil by filtration over microfilters.

The interval at which the cleaning treatments take place is generally dependent on the impurity content of the starting oil. It is generally known that the concentration of the impurities, especially waxes, can influence the reduction in flux during the filtration process. The reduction in the flux is less per time-unit for an oil mixture comprising less impurities at the start of the filtration. If the starting oil to be purified for instance contains a high wax content of over 600 ppm, the filters will foul more quickly. In that case all cleaning treatments should preferably be performed at a higher frequency. For oil comprising 100–500 ppm wax-impurity, preferably the above indicated time intervals are used for the cleaning treatments. For oils comprising less than 100 ppm impurity in the form of wax, the backblowing with gas is preferably carried out at a frequency of once every 5–9 hours, the backflushing with oil is preferably carried out at a frequency of once every 3–14 days, and the treatment with alkaline material is preferably carried out at a frequency of once every 3–7 months.

The cleaning process according to the invention is applicable in all known filter processes. The filtration can preferably be performed in the cross-flow filtration mode or the dead-end filtration mode. The most preferred filtration mode is dead end filtration.

Oils suitable for said known refining processes comprise edible or non-edible oils, preferably the oil is selected from the group of sunflower oil, maize oil, rape seed oil, cottonseed oil, olive oil, palm olein, palm kernel oil, coconut oil, soy-bean oil, rice bran oil, grape seed oil, safflower oil, groundnut oil, sesam oil, wheat germ oil, walnut oil, pistachio oil, and the like. The cleaning process according to the invention can be applied to filters used for treating semi-refined oils that have been subjected to one or more refining steps already, but said cleaning process is also suitable for cleaning filters fouled in the refining of virgin oils.

The cleaning process according to the invention can be carried out after dismantling the filtering unit, but preferably the whole process is carried out as a cleaning in place process. This will immediately result in a cost saving.

The quality of the dewaxed oils after filtration is determined by the cold test as described in the examples. The dewaxed oils are of good quality according to this test.

Figure 2:
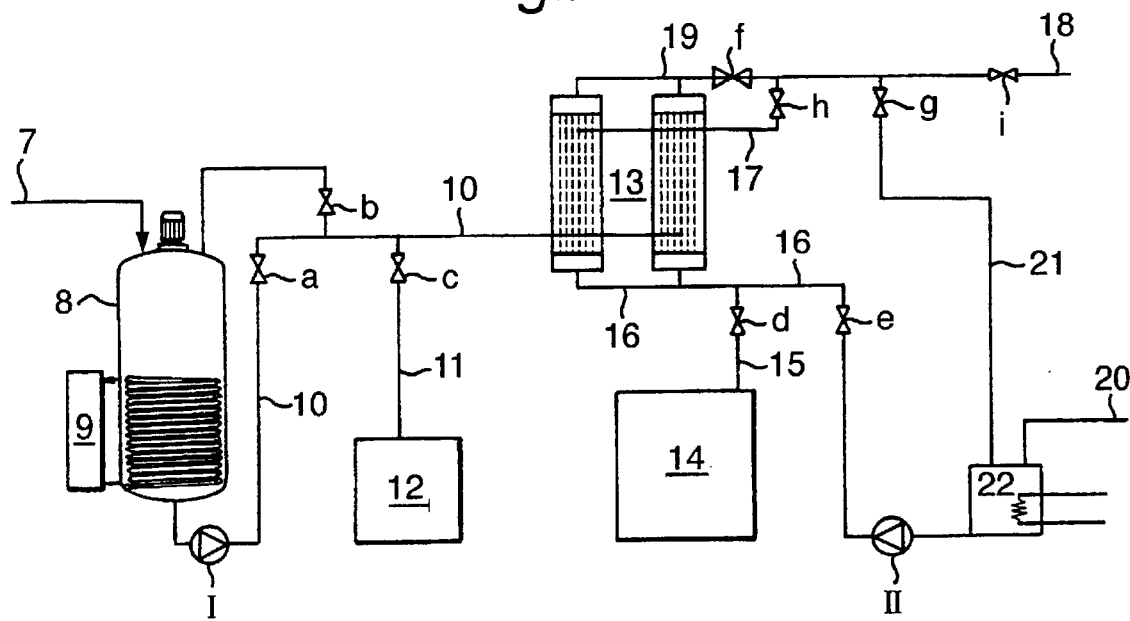
FIG. 2 shows a system for treating the oil to be dewaxed including a pair of membrane modules.

The method of cleaning membranes according to the invention and the microfilters used are illustrated in FIGS. 1 and 2 of which FIG. 1 shows the set up of the microfilter modules and FIG. 2 shows a flow scheme of the set up for dewaxing and subsequent filtration. In FIG. 1, the set of modules (1) is set vertically and comprises several modules (6), whereby the oil to be filtered is fed to the outside of the membranes (3,4). Each module (6) comprises a bundle of hollow fiber membranes. Dewaxed oil permeates through the membranes and is collected at the bottom of the cavity of the membranes. By way of the bottom clean connection (5) dewaxed oil flows to the dewaxed oil buffer tank. The modules are also provided with a top clean connection (2).

In the flow scheme in FIG. 2, the oil to be dewaxed (7) is fed to a crystalliser (8) which crystalliser is provided with a cooling system (9). By way of conduit (10) the oil which has been subjected to a winterization process is pumped by pump (I) to the filtration module (13) provided that valve (a) is in the open position, and valves (b) and (c) are in the closed position. After filtration, the dewaxed oil flows from the filter modules to the dewaxed oil buffer tank (14) by way of conduit (15) provided that valve (d) is in the open position and valves (e), (h), (f) are in the closed position.

During the cleaning step of backflushing with gas, valves (a), (b), (d) and (h) are closed and the membranes are reversely pressurized with nitrogen flow (18) through conduit (19) and wax is blown back to the wax tank (12) by opening valve (c) in conduit (11). The rinse oil tank (22) is in the meantime filled with rinse oil to use for backflush with oil. During backflushing with oil valves (a), (b), (c), (d), (f), (i) are in the closed position and valves (e), (g), (h) are in the open position. The rinse oil is pumped by pump (II) from tank (22) via valve (e) and conduit (16) to the permeated liquid side of the membranes and is recycled to the rinse oil tank (22) by way of conduit (17) and (21). The rinse tank (22) is connected to a supply of clean oil and alkaline solution (20).

The method according to the invention will further be illustrated by the following, non-limiting examples.

General Procedures

Conventionally neutralized and bleached sunflower oil containing about 100–1500 ppm wax was dried to a water content of preferably less than 0.05% by wt and was heated to about 80° C. to ensure that any wax crystals were dissolved. Thereafter the oil is subjected to controlled cooling which comprises a first quick cooling step in which the oil is quickly cooled to the solubility temperature of the wax present in the oil (about 45° C.), and a second cooling step, comprising a cooling rate of 6° C. per hour and a maximum temperature difference between the oil and the coolant medium of 8° C. The oil end temperature was 8° C. The oil/crystallized wax slurry obtained was immediately microfiltered over Microza TP 313 filters from Asahi Chemical International Limited Japan, without any additional maturation time or additives. A maximum flux rate is reached after some minutes and is taken as the top flux, because during the first minutes of microfiltration the flux is influenced by filling up the filter modules. The transmembrane pressure is 3 bar.

Sunflower oil obtained from the oil refining process in which a cleaning procedure according to the invention was used, was subjected to a cold test. The oil was kept at 0° C. for 24 hours. The oil stayed clear and no clouds were formed.

IA Procedure for Flushing with Gas

The procedure involves the following steps with for example nitrogen gas:

1. Concentrated Oil Recovery

With a gas back pressure the non-dewaxed oil is blown from the filter modules (13) into the feed tank. The minimum nitrogen flow required for emptying the filter and for Back blowing is 0.3 Nm$^3$/min/module.

2. Gas Back blow

This involves back blowing the wax from the membranes with the gas. This step lasts for about 30 seconds. During nitrogen back blowing the maximum pressure allowed is 3 barg (3 bar above atmospheric pressure). In practice the nitrogen that is used should preferably be dehumidified and ultrafiltered.

IB Procedure for Backflushing with Oil

This procedure involves the following steps:

1. Once the maximum flux after backflush with compressed gas has reduced to less than 90% of the top flux, the (hot) oil rinse tank (22) is filled with (non)-dewaxed oil.
2. The rinse oil is then filtered with a pre-filter of the crystallizer.
3. An $N_2$ blanket is applied to prevent polymerization.
4. The rinse oil is heated to a temperature of about 75° C.
5. In a concentrated oil recovery step the oil in the filter modules is blown back to the feed tank with a gas, for example nitrogen.
6. The actual cleaning procedure is started by closing the top clean connection (2) and rinsing the membranes from the inner side to the outer side. The rinse oil is recirculated (17,21) back to the rinse oil tank (22). Rinsing is continued until the temperature of the outcoming oil is 75° C. (equal to incoming oil). After rinsing, the rinse oil tank is emptied into the wax oil tank.

IC Procedure for Treatment with Alkaline Material

After the maximum flux after backflush with compressed gas and oil has reduced to about 90% or less of the top flow, the treatment with alkaline material is started.

1. In a concentrated oil recovery step the oil in the modules is blown back to the feed tank with a gas, for example nitrogen.

2. The backblowing with nitrogen gas is continued for 10 minutes at a back blow pressure of 3 barg.
3. The rinse oil tank (22) is filled with water and the contents are heated to 60° C.
4. The filters (13) are rinsed with hot water from the inside (16) to the outside of the membrane (17) for 30 minutes.
5. Step 4 is repeated but now a 6% W/W solution of NaOH at 60° C. is used.
6. Step 4 is repeated with water until the pH is below 8.
7. The modules are subjected to back blow with nitrogen gas (18) for 10 min at 3 bar.

Comparative Example (C)

Oil with a wax content of 600 ppm in which wax crystals have formed according to the general procedure as indicated above is transferred to the filtration unit (13) as indicated in flow FIG. 2. Filtration starts with filling and deaeration of the filter. During the filtration process the oil/wax slurry is fed to the outside of the modules by way of conduit (10). The oil is filtered via a free outlet (16) into the dewaxed oil buffer tanks (14). The filtration is carried out at a constant flow until a pre-set maximum filter pressure has been reached. Subsequently the filter pressure is kept constant by gradually reducing the flow. The maximum filtrate flow rate is 65 kg/hour/filter module. When the flow rate has reduced to 35 kg/hour/filter module the filtration is stopped, the filter emptied and regenerated by backblowing with nitrogen gas. Conditions for nitrogen back blow were: 3 barg. The nitrogen backblowing was further performed according to procedure IA. Several cycles of nitrogen back blow and recovery of the maximum flux rate are shown in Table 1. One period is the cycle time of 1 nitrogen back flush action. The average time between two nitrogen back blow cycles is around 30 minutes.

TABLE 1

Decrease of maximum flux rate after several cycles of N₂ back blow

| Time (hours) | number of N₂ back blow action | Maximum flux rate (kg/hour/filter module) |
| --- | --- | --- |
| 0 | 0 | 65 |
| 1 | 2 | 61 |
| 2 | 4 | 58 |
| 3 | 6 | 54 |
| 4 | 8 | 50 |

In period 0 the maximum flux rate measured is equal to the top flux rate. After 8 times of back flow with nitrogen gas, the maximum flux rate had gone down to 50 kg/hour/module. Then the backflushing with oil as described in procedure IB was started. The oil used was hot non-winterized oil at a temperature of 75° C. The flux rate recovered and several cycles of back blow with nitrogen gas at an interval of 30 minutes, and oil backflushing at a considerably longer interval, were performed. The maximum flux rate that was monitored after each oil backflushing step is mentioned in Table 2. The average interval time between two oil backflushing cycles is 6 hours or 350 kg/filter module.

TABLE 2

Flux rate decrease after backflushing with oil.

| ton/filter module | Time, hours | number of oil backflushing cycles | Maximum flux rate (kg/filter module) |
| --- | --- | --- | --- |
| 0 | 0 | 0 | 65 |
| 30 | 1.8 | 5 | 64 |
| 60 | 3.5 | 10 | 63 |
| 90 | 5.2 | 15 | 62 |
| 120 | 7.0 | 20 | 61 |

From these results it is concluded that the combination of back blow with gas and backflushing with oil will result in a temporary recovery of the flux rate. Despite that, the maximum flux rate has decreased after each cleaning cycle with hot oil. After 20 cycles, the maximum flux that can be reached after the cleaning step with oil is 94% of the top flux.

EXAMPLE 1

In this experiment oil was dewaxed according to the same process as in comparative example (C). After 60 cycles (or 25 ton per filter module) of oil backflushing in combination with back blow with nitrogen gas, the maximum flux rate, measured after backflushing with oil, had decreased to 50 kg/h/filter module (77% of the top flux). At this time the cleaning procedure with alkaline solution as described in procedure 1C was started. The alkaline material used was 6 wt % NaOH caustic solution. The flux rate recovery after several cleaning cycles with the alkaline solution is presented in Table 3. The average time between two alkaline treatments is 3 to 4 weeks.

TABLE 3

Flux rate recovery after several cycles of alkaline treatment.

| Ton/filter module | time (weeks) | number of alkaline treatments | Maximum flux rate kg/h/filter module |
| --- | --- | --- | --- |
| 0 | 0 | 0 | 65 |
| 25 | 3 | 1 | 64 |
| 50 | 6 | 2 | 64 |
| 75 | 12 | 3 | 65 |

EXAMPLE 2

The same experiment as in example 1 was performed but this time a 6 wt % solution of SU 825, comprising surfactants and sequestrants in addition to NaOH, (obtained from Diversey Lever), was used as the alkaline material. The flux rate results are summarized in Table 4.

TABLE 4

Flux rate recovery after several cycles of alkaline treatment with SU 825

| ton/filter module | time (weeks) | number of alkaline treatments | Maximum flux rate kg/h/filter module |
|---|---|---|---|
| 0 | 0 | 0 | 65 |
| 25 | 3 | 1 | 63 |
| 50 | 6 | 2 | 65 |
| 75 | 12 | 3 | 64 |

What is claimed is:

1. Method for cleaning porous membranes used in an oil refining process comprising regularly treating said membranes in situ by applying the steps of:
  a) backblowing with a gas when the flux through the membranes has reduced to less than 95% of the top flux, as represented by the flux through the membranes when they are used for the first time in the refining process, the flux through the membranes achieved immediately after the cleaning treatment step representing a maximum flux;
  b) backflushing with edible oil, when a maximum flux measured after backblowing with a gas, has diminished to less than 90% of the top flux; and
  c) treating the membranes with alkaline material when a maximum flux measured after backflushing with oil has diminished to less than 90% of the top flux;
with the provision that said method does not involve the use of organic solvents to clean the membranes.

2. Method according to claim 1, wherein step (a) of backblowing with gas is carried out at a frequency of more than once every 8 hours.

3. Method according to claim 1 or 2 wherein step (b) of backflushing with oil is carried out at a frequency of more than once every 14 days.

4. Method according to claim 1 or 2 wherein step (c) of treating with alkaline material is carried out at a frequency of more than once every 7 months.

5. Method according to claim 4, wherein step (c) of treating with alkaline material is carried out at a frequency of more than once every 6 weeks.

6. Method according to claim 1 or 2 wherein step (b) of backflushing with oil is performed with hot non-winterized oil.

7. Method according to claim 1 or 2 wherein the alkaline treatment is performed with a solution that comprises one or more compounds selected from the group consisting of caustic soda, surfactants, detergents.

8. Method according to claim 1 or 2 wherein the porous membranes are microfilters having an average pore diameter of 0.05–5 μm.

9. Method according to claim 1 or 2 wherein the membranes are in the form of a module which comprises a housing comprising a package of hollow fibres made of a symmetric, synthetic polymer membrane, said membranes having an average pore diameter of 0.2–0.9 μm.

10. Method according to claim 9 wherein the synthetic polymer membrane comprises polyvinylidene fluoride.

11. Method according to claim 1 or 2 wherein the oil with which the membranes are backflushed is the same as the oil to be refined.

12. Method according to claim 1 or 2 wherein step (a) of backblowing with gas is carried out with compressed gas.

13. Method according to claim 1 or 2 wherein the refining process comprises using said membranes in the dewaxing of the oils.

* * * * *